US012640284B2

(12) United States Patent
Jung et al.

(10) Patent No.: US 12,640,284 B2
(45) Date of Patent: May 26, 2026

(54) MARINE CABLE FOR OFFSHORE WIND POWER HAVING AN IMPROVED WATER-TREE PROPERTY

(71) Applicant: LS CABLE & SYSTEM LTD., Anyang-si (KR)

(72) Inventors: Hyun Jung Jung, Gunpo-si (KR); Gi Joon Nam, Seocho-gu (KR); Kyoung Soo Kim, Bucheon-si (KR); Yi Seul Yang, Gunpo-si (KR)

(73) Assignee: L'S CABLE & SYSTEM LTD., Anyang-si (KR)

( * ) Notice: Subject to any disclaimer, the term of this patent is extended or adjusted under 35 U.S.C. 154(b) by 52 days.

(21) Appl. No.: 18/377,874

(22) Filed: Oct. 9, 2023

(65) Prior Publication Data

US 2024/0177888 A1 May 30, 2024

(30) Foreign Application Priority Data

Nov. 25, 2022 (KR) ........................ 10-2022-0160830
Dec. 2, 2022 (KR) ........................ 10-2022-0166186

(51) Int. Cl.

| | |
|---|---|
| ***H01B 7/28*** | (2006.01) |
| ***H01B 3/26*** | (2006.01) |
| ***H01B 3/30*** | (2006.01) |
| ***H01B 7/00*** | (2006.01) |
| ***H01B 7/14*** | (2006.01) |

(Continued)

(52) U.S. Cl.

CPC ............. *H01B 7/2813* (2013.01); *H01B 3/26* (2013.01); *H01B 3/307* (2013.01); *H01B 7/0009* (2013.01); *H01B 7/14* (2013.01); *H01B 7/20* (2013.01); *H01B 7/285* (2013.01)

(58) Field of Classification Search

CPC . H01B 3/26; H01B 3/30; H01B 3/307; H01B 3/44; H01B 3/441; H01B 7/009; H01B 7/14; H01B 7/18; H01B 7/20; H01B 7/28; H01B 7/2813; H01B 7/285; H01B 9/02; H01B 9/04; H01B 9/06; H01B 11/22

USPC .......................................... 174/102 R–121 R

See application file for complete search history.

(56) References Cited

U.S. PATENT DOCUMENTS 4,626,619 A * 12/1986 Uematsu ............. H01B 7/2825
174/106 SC
5,444,184 A * 8/1995 Hassel .................. H01B 11/02
379/90.01

(Continued)

FOREIGN PATENT DOCUMENTS

| | | | |
|---|---|---|---|
| CA | 2220495 | C | 12/1999 |
| CN | 101717542 | A | 6/2010 |

(Continued)

OTHER PUBLICATIONS

Chen et al, Accelerated Water tree aging of crosslinked polyethylene with different degrees of crosslinking, pp. 83-90, Jan. 2016 (Year: 2016).*

(Continued)

*Primary Examiner* — William H. Mayo, III
(74) *Attorney, Agent, or Firm* — K&L Gates LLP

(57) ABSTRACT

A marine cable may be provided with at least one core including a conductor and an insulating layer that surrounds the conductor, such that sizes of water trees, caused by diffusion of moisture, in the insulating layer are controlled.

9 Claims, 2 Drawing Sheets

(51) Int. Cl.
*H01B 7/20* (2006.01)
*H01B 7/285* (2006.01)

(56) References Cited

U.S. PATENT DOCUMENTS

| | | | | |
|---|---|---|---|---|
| 5,892,874 | A * | 4/1999 | Houghton | G02B 6/4416 385/101 |
| 2012/0080213 | A1* | 4/2012 | Furuheim | H01B 7/28 174/106 R |
| 2013/0175068 | A1* | 7/2013 | Sutton | C08L 23/06 174/110 SR |
| 2016/0340492 | A1* | 11/2016 | Sun | H01B 3/441 |
| 2018/0305533 | A1* | 10/2018 | Chaudhary | H01B 3/307 |
| 2019/0027269 | A1* | 1/2019 | Chaudhary | C08L 23/08 |
| 2022/0049073 | A1* | 2/2022 | Han | C08L 23/06 |

FOREIGN PATENT DOCUMENTS

| | | | | |
|---|---|---|---|---|
| CN | 201918202 | U | 8/2011 | |
| CN | 204117659 | U | 1/2015 | |
| CN | 113436795 | A | 9/2021 | |
| JP | 2021075621 | A * | 5/2021 | H01B 7/02 |
| JP | 2022015542 | A | 1/2022 | |
| KR | 20210081956 | A | 7/2021 | |
| TW | M448776 | U | 3/2013 | |
| WO | 2018041217 | A1 | 3/2018 | |

OTHER PUBLICATIONS

Ida et al, Characteristics of Water Trees in Submarine Cables (Wet-Design) for Offshore Wind Power Generation, pp. 29-33, Apr. 2022 (Year: 2022).*

Cree, et al.; “Potential Use of New Water Tree Retardant Insulation in Offshore Wind Farm Array Cables”; 9th International Conference on Insulated Power Cables; Jun. 2015; (4 pages).

Li, et al.; “Effect of Assistant Crosslinker (TAIC) on Improving Water Tree Resistance of Crosslinked Polyethylene”; IEEE; 2022; (4 pages).

Chen, et al.; Accelerated water tree aging of crosslinked polyethylene with different degrees of crosslinking; ScienceDirect; 2016; (8 pages).

Extended Search Report for related European Application No. 23191180.1; action dated Feb. 12, 2024; (8 pages).

Office Action for related Taiwanese Application No. 112129443; action dated Feb. 27, 2024; (8 pages).

* cited by examiner

MARINE CABLE FOR OFFSHORE WIND POWER HAVING AN IMPROVED WATER-TREE PROPERTY

CROSS-REFERENCE TO RELATED APPLICATION

This application claims the benefits of Korean Patent Application No. 10-2022-0160830 filed on Nov. 25, 2022, and Korean Patent Application No. 10-2022-0166186 filed on Dec. 2, 2022, which are hereby incorporated by reference herein in their entirety.

FIELD

The present disclosure relates to a marine cable for offshore wind power having an improved water-tree property. More particularly, it relates to a marine cable for offshore wind power, which may effectively suppress formation of water trees caused by diffusion of moisture, having penetrated into cores of the cable, in insulating layers so as to improve dielectric strength and consequently secure a long lifespan.

BACKGROUND

Marine cables have been installed for a long time so as to achieve power transmission to island areas and intercontinental communication linkage, offshore wind power acquired by installing a wind power generator on the sea has more advantages in terms of wind conditions, security of a site, noise problems, etc., than onshore wind power and thus construction of offshore wind power farms continues to increase, and therefore, interest in marine cables for offshore wind power is increasing.

The marine cables for offshore wind power in an offshore wind power farm connect a wind turbine provided on the sea or an offshore substation to a landing part, and are fixedly laid under the seabed or are separated from the seabed and connected to the wind power turbine on the sea or the offshore substation, in each section.

The marine cables for offshore wind power are laid under submarine environments and must thus ensure water-barrier performance so as to suppress penetration and diffusion of moisture into the marine cables, marine cables for offshore wind power, which are laid in a section in which the marine cables for offshore wind power are fixed to the seabed, are referred to as export marine cables for offshore wind power, and the export marine cables for offshore wind power may have a lead sheath layer so as to suppress moisture penetration.

However, marine cables for offshore wind power, which are separated from the seabed and are connected to the wind power turbine on the sea or the offshore substation, have difficulty in employing a lead sheath layer, which interferes with movement or bending of the marine cables by sea current or waves, because the marine cables must ensure movement or bending, and the above marine cables for offshore wind power are referred to as inter-array marine cables for offshore wind power.

The inter-array marine cables for offshore wind power may be divided into dry type marine cables for offshore wind power, semi-wet type marine cables for offshore wind power, and wet type marine cables for offshore wind power. The dry type marine cables for offshore wind power has a lead sheath layer, the semi-wet type marine cables for offshore wind power have a sheath layer, and the wet type marine cables for offshore wind power do not have any sheath layer. Absence of a lead sheath layer allows moisture to penetrate into a marine cable for offshore wind power, and the penetrated moisture is diffused in insulating layers of cores and thus forms water trees, thereby reducing dielectric strength and consequently shortening the lifespan of the marine cable for offshore wind power. A conventional marine cable for offshore wind power has used a shield layer formed of metal wires instead of the lead sheath layer so as to suppress moisture penetration and diffusion, but still has difficulty in suppressing penetration of moisture into insulating layers of cores.

Therefore, a marine cable for offshore wind power, which may effectively suppress formation of water trees caused by diffusion of moisture, having penetrated into cores of the cable, in insulating layers so as to improve dielectric strength and consequently secure a long lifespan, has been desperately required.

SUMMARY

The present disclosure has been made in view of the above problems, and it is an object of the present disclosure to provide a marine cable for offshore wind power, which may effectively suppress formation of water trees caused by diffusion of moisture, having penetrated into cores of the cable, in insulating layers so as to improve dielectric strength and consequently secure a long lifespan.

According to an aspect of the present disclosure, there is provided a marine cable for offshore wind power, comprising at least one core comprising a conductor and an insulating layer configured to surround the conductor, wherein sizes of water trees in the insulating layer, measured based on standard ASTM D6097, are equal to or less than 850 μm.

According to an another of the present disclosure, there is provided the marine cable, wherein a degree of crosslinking of the insulating layer is equal to or greater than 77%, and a degree of crystallinity of the insulating layer is equal to or greater than 35%.

According to other of the present disclosure, there is provided the marine cable, wherein the insulating layer comprises crosslinked polyethylene (XLPE).

According to other of the present disclosure, there is provided the marine cable, wherein breakdown voltage (BDV) of the insulating layer is equal to or greater than 80 kV/mm.

According to other of the present disclosure, there is provided the marine cable, wherein the at least one core comprises the conductor, an inner semiconductive layer configured to surround the conductor, the insulating layer configured to surround the inner semiconductive layer, an outer semiconductive layer configured to surround the insulating layer, a wire shield layer configured to surround the outer semiconductive layer, and a core jacket configured to surround the wire shield layer.

According to other of the present disclosure, there is provided the marine cable, wherein the at least one core further comprises an inner water-barrier tape layer provided between the outer semiconductive layer and the wire shield layer and configured to surround the outer semiconductive layer, an outer water-barrier tape layer configured to surround the wire shield layer, and a metallic sheath layer configured to surround the outer water-barrier tape layer.

According to other of the present disclosure, there is provided the marine cable, wherein the outer water-barrier tape layer comprises at least one selected from the group consisting of powder, a tape, a coating layer, and a film, comprising a superabsorbent polymer (SAP).

According to other of the present disclosure, there is provided the marine cable, comprising a plurality of cores, wherein filling members are provided at a center among the plurality of cores and in regions outside the plurality of cores.

According to other of the present disclosure, there is provided the marine cable, wherein the filling members comprise yarns formed of polypropylene.

According to other of the present disclosure, there is provided the marine cable, wherein: a binding tape layer configured to finish the plurality of cores and the filling members so as to form a circular cross-section is provided; and an armor bedding layer comprising a mixture of polypropylene yarns and bitumen is provided outside the binding tape layer.

According to other of the present disclosure, there is provided the marine cable, wherein: a metal armor layer is provided outside the armor bedding layer; and an anticorrosion layer comprising a mixture of polypropylene yarns and bitumen is provided outside the metal armor layer.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
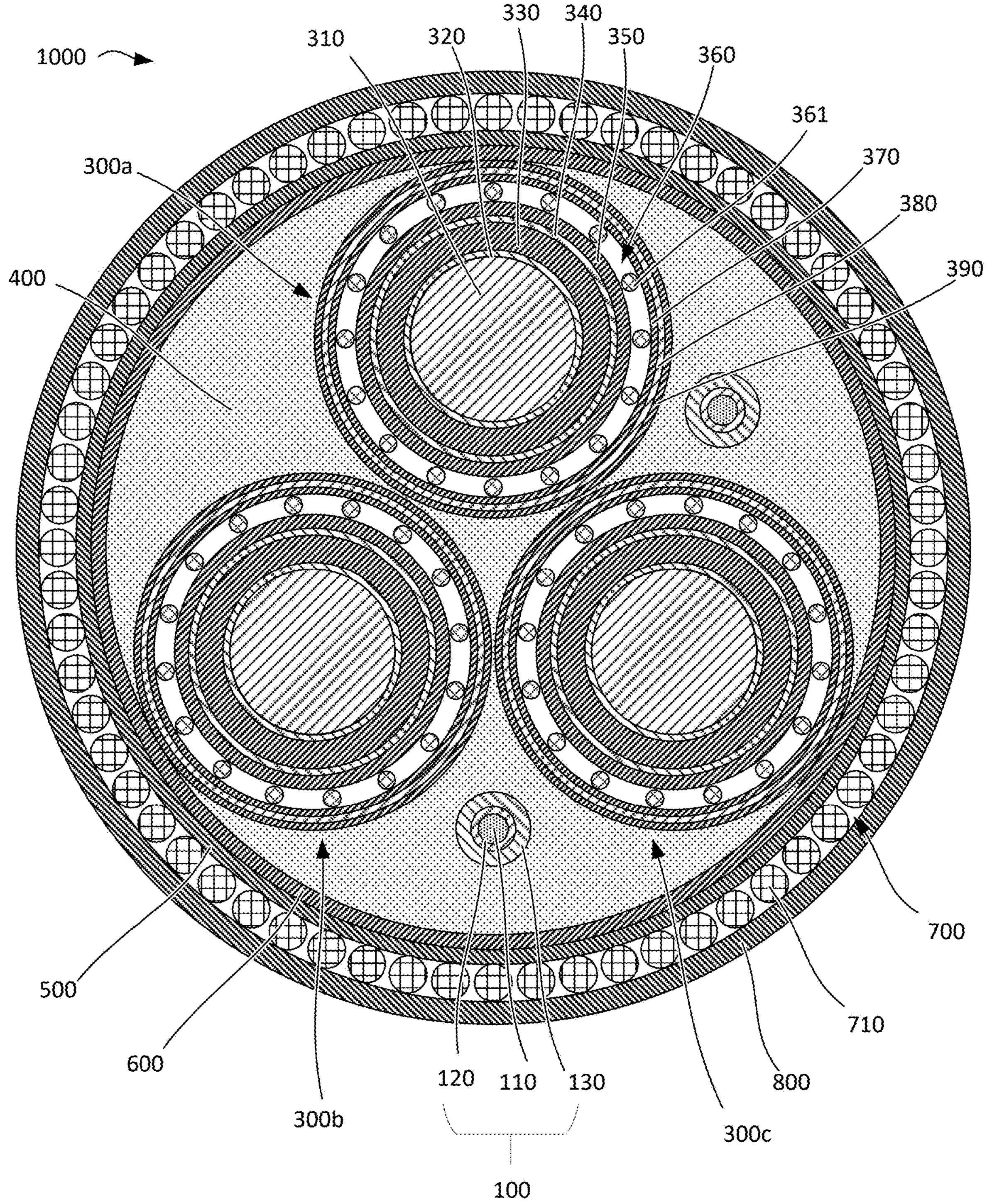
FIG. 1 is a view schematically cross-sectional illustrating the structure of a marine cable for offshore wind power according to one embodiment of the present disclosure.

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims. The same reference numerals designate the same elements throughout the specification.

Figure 2:
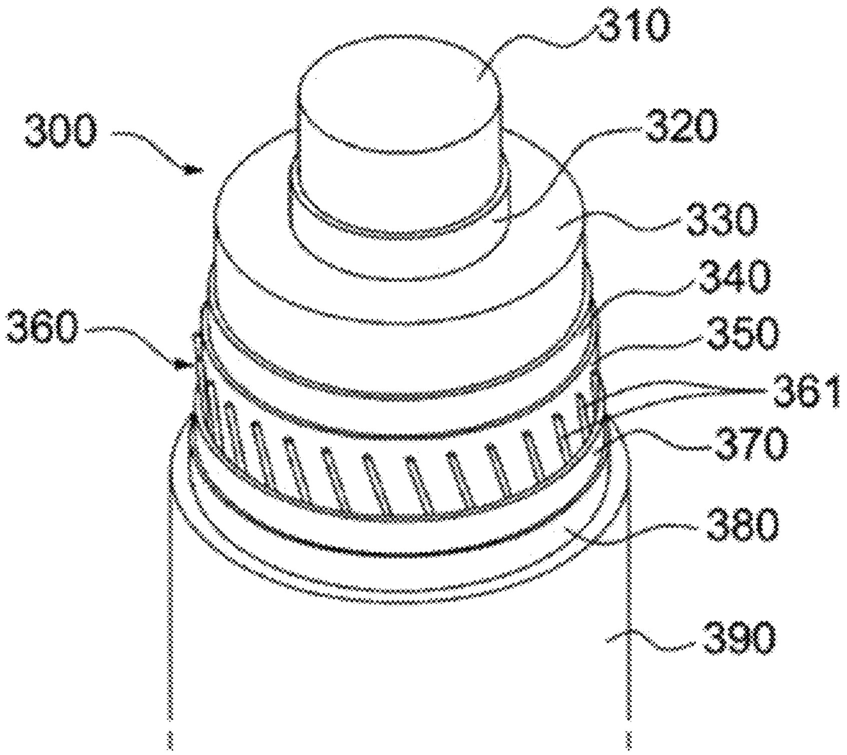
FIG. 2 is a longitudinal-sectional view of one core of the marine cable for offshore wind power shown in FIG. 1.

FIG. 1 is a cross-sectional view schematically illustrating the structure of a marine cable for offshore wind power according to one embodiment of the present disclosure, and FIG. 2 is a longitudinal-sectional view of one core of the marine cable for offshore wind power shown in FIG. 1.

A marine cable 1000 for offshore wind power according to the present disclosure may be a three-phase AC power cable in which three cores 300*a*, 300*b* and 300*c* are disposed in a triangular form, as shown in FIG. 1. In order to dispose the three cores 300*a*, 300*b* and 300*c* so as to form a circular cross-section, filling members 400 formed of fibers may be provided at the center among the cores 300*a*, 300*b* and 300*c* and in regions outside the cores 300*a*, 300*b* and 300*c*. At least one optical unit 100 having a plurality of optical fibers may be accommodated in the filling members 400.

Here, the optical unit 100 may include at least one optical fiber 110, and a tube 120 configured to accommodate the at least one optical fiber 110. Each optical unit 100 includes a designated number of optical fibers 110 which is mounted, together with a filler, in the tube 120, and the tube 120 may use a material having rigidity, such as stainless steel. The optical unit 100 may further include a sheath 130 configured to surround the tube 120.

The filling members 400 generally use yarns made of polypropylene. When the marine cable 1000 for offshore wind power is formed by combining the cores 300*a*, 300*b* and 300*c*, the at least one optical unit 100 and the yarns, the cores 300*a*, 300*b* and 300*c*, the at least one optical unit 100 and the yarns may be combined by predetermined pitches so as to form a circular cross-section. The filling members 400 formed of fibers are provided to implement waterproof performance and form the circular cross-section, and an intervening member (not shown) formed of an extruded resin may be used instead of the filling members 400. In this case, the optical unit 100 may have a structure which is inserted into the intervening member (not shown) so as to be accommodated therein.

Further, a binding tape layer 500 configured to finish the three cores 300*a*, 300*b* and 300*c* and the filling members 400 which are combined to form the circular cross-section may be provided, and an armor bedding layer 600 may be provided outside the binding tape layer 500. The armor bedding layer 600 may serve to provide a mounting surface on which a metal armor layer 700 provided outside the armor bedding layer 600 is mounted.

Here, the armor bedding layer 600 may be formed of a mixture of polypropylene (PP) yarns and bitumen. The metal armor layer 700 may be provided outside the armor bedding layer 600, and armor wires 710 may be disposed in the metal armor layer 700 so that the metal armor layer 700 may function to protect the marine cable 100 for offshore wind power in harsh submarine environments.

An anticorrosion layer 800 formed of a mixture of polypropylene (PP) yarns and bitumen in the same manner as the armor bedding layer 600 may be provided outside the metal armor layer 700, and thereby, manufacture of the marine cable 100 for offshore wind power may be completed.

As shown in FIGS. 1 and 2, a core 300 may sequentially include a conductor 310, an inner semiconductive layer 320, an insulating layer 330, an outer semiconductive layer 340, an inner water-barrier tape layer 350, a wire shield layer 360, an outer water-barrier tape layer 370, a metallic sheath layer 380, and a core jacket 390.

The conductor 310 may serve as a passage through which current flows so as to transmit electric power, and may be formed of a material having excellent conductivity so as to minimize electric power loss and having strength and flexibility suitable for use in manufacture of cables, for example, copper or aluminum.

The conductor 310 may be a compacted circular conductor acquired by compacting a stranded cable, including a plurality of circular coils, so as to have a circular cross-section, or a flat conductor including a central circular coil and a flat coil layer including a plurality of flat coils configured to surround the central circular coil and formed to have a circular cross-section on the whole, and the flat conductor has a greater conductor-occupying ratio than the compacted circular conductor and may thus reduce a cable outer diameter.

The conductor 310 does not have a smooth surface, and may thus cause a non-uniform electric field and partially easily cause corona discharge. Further, when a gap is formed between the surface of the conductor 310 and the insulating layer 330, which will be described below, the electric field is concentrated on the gap, and thus, insulation performance may be reduced.

Therefore, the inner semiconductive layer 320 may be provided outside the conductor 310. The inner semiconductive layer 320 may include a base resin, such as ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso)propyl methacrylate (EPMA), ethylene butyl acrylate (EBA), or ethylene butyl methacrylate (EMBA), and conductive particles, such as carbon black, carbon nano-tubes, carbon nano-plates, or graphite, added to the base resin, and may thus have semiconductivity.

The inner semiconductive layer 320 prevents sudden changes in the electric field between the conductor 310 and the insulating layer 330, which will be described below, and thus serves to stabilize insulation performance. Further, the inner semiconductive layer 320 may suppress non-uniform distribution of charges on the surface of the conductor 310 so as to uniformize the electric field, and may prevent formation of a gap between the conductor 310 and the insulating layer 330 so as to suppress corona discharge, dielectric breakdown, etc.

Further, the inner semiconductive layer 320 may include 0.1 to 5 parts by weight of a crosslinking agent based on 100 parts by weight of the base resin. Since crosslinking byproducts generated during crosslinking of the inner semiconductive layer 320 may penetrate into the insulating layer 330 and may act as crystal nuclei, it is necessary to adjust the content of the crosslinking agent in the inner semiconductive layer 320.

The insulating layer 330 is provided outside the inner semiconductive layer 320, and electrically insulates the conductor 310 from the outside so as to prevent leakage of current to the outside along the conductor 310. In general, the insulating layer 330 must have a high breakdown voltage and stably maintain insulation performance for a long time. Further, the insulating layer 330 must have low dielectric loss and have resistance performance to heat, such as heat resistance.

Therefore, the insulating layer 330 may use a polyolefin resin, such as a polyethylene or polypropylene resin, and may preferably use a polyethylene resin. Here, the polyethylene resin may be a crosslinking resin, i.e., crosslinked polyethylene (XLPE) including a crosslinking agent, and the crosslinking agent may include a peroxide, such as dicumyl peroxide, benzoyl peroxide, lauryl peroxide, tert-butyl cumyl peroxide, di(tert-butyl peroxy isopropyl) benzene, 2,5-dimethyl-2,5-di(tert-butyl peroxy) hexane, or di-tert-butyl peroxide. Further, the insulating layer 330 may additionally include an antioxidant, an extrudability enhancer, a treeing inhibitor, and a co-crosslinking agent, as additives.

The outer semiconductive layer 340 may be provided outside the insulating layer 330. The outer semiconductive layer 340 comprises an insulating material and conductive particles, for example, carbon black, carbon nano-tubes, carbon nano-plates, or graphite, added to the insulating material so as to have semiconductivity, in the same manner as the inner semiconductive layer 320, and may thus suppress non-uniform distribution of charges between the insulating layer 330 and the wire shield layer 360, which will be described below, so as to stabilize insulation performance. Further, the outer semiconductive layer 340 may smooth the surface of the insulating layer 300 of the marine cable 100 so as to mitigate concentration of the electric field and thus to prevent corona discharge, and may serve to physically protect the insulating layer 330.

The wire shield layer 360 is provided outside the outer semiconductive layer 340. The wire shield layer 360 may be grounded at the end of the marine cable 100 so as to serve as a passage, through which current flows, in the event of an accident, such as a ground fault or a short circuit, may protect the marine cable 100 from external impact, and may perform a shielding function so as to prevent the electric field from being discharged to the outside of the marine cable 100.

As shown in FIG. 2, the wire shield layer 360 may be formed of a material, such as copper or copper clad aluminum, and may be provided by cross-winding shield wires 361, having a diameter of 0.2 mm to 2.0 mm and spaced apart from each other by predetermined intervals, in a spiral.

A metal screen layer (not shown) configured such that a metal tape is cross-wound in a spiral may be provided outside the wire shield layer 360, may be conductively connected to the respective shield wires 361, and may thus provide a function of shunting current.

The core 300 may further include at least one water-barrier tape layer provided outside the outer semiconductive layer 340 so as to absorb moisture. The water-barrier tape layer may be provided at at least one of the inside or the outside of the above-described wire shield layer 360. Although the embodiment shown in FIGS. 1 and 2 describes that the inner water-barrier tape layer 350 and the outer water-barrier tape layer 370 are provided inside and outside the wire shield layer 360, respectively, the outer water-barrier tape layer 370 alone may be provided because moisture mainly penetrates from the outside.

A water-barrier tape forming the water-barrier tape layers 350 and 370 is provided in the form of powder, a tape, a coating layer, or a film, including a superabsorbent polymer (SAP) which has a high absorption rate of moisture having penetrated into the marine cable 100 and excellent ability to maintain a swollen state in which the superabsorbent polymer (SAP) absorbs moisture, and serves to prevent moisture from penetrating in the length direction of the marine cable 100. The water-barrier tape layers 350 and 370 may have semiconductivity so as to prevent rapid changes in the electric field. The water-barrier tape layers 350 and 370 may be provided to a thickness of 0.2 mm to 1.4 mm.

Further, the metallic sheath layer 380 may be further provided outside the outer water-barrier tape layer 370. The metallic sheath layer 380 is formed by extruding a molten metal on the outer surface of the outer water-barrier tape layer 370 so as to have a continuous outer surface without any joint, and may improve water-barrier performance. The screen uses lead or aluminum and, particularly, in the case of the marine cable 100 for offshore wind power, the screen preferably uses lead having excellent corrosion resistance to seawater, and more preferably uses a lead alloy including other metal elements so as to complement mechanical properties.

In the case of the marine cable 100 for offshore wind power laid under submarine environments, the metallic sheath layer 380 may be formed to seal the core 300 so as to prevent deterioration of insulation performance caused by penetration of foreign substances, such as moisture. Further, in the case in which the wire shield layer 360 and the water-barrier tape layers 350 and 370 are provided, the water-barrier function is exhibited to some degree, and thus, the metallic sheath layer 380 may be omitted.

The core jacket layer 390 may be provided outside the metallic sheath layer 380. The core jacket layer 390 forms the outermost part of the core 300, and the core jacket layer 390 and the metallic sheath layer 380 may function to improve corrosion resistance and water-barrier performance and to protect the core 300 from various environmental factors, such as moisture penetration, mechanical damage, corrosion, etc., and fault current, which may affect the power transmission performance of the marine cable 100.

The core jacket 390 may be formed of a resin, such as polyvinyl chloride (PVC) or polyethylene. The core jacket 390 preferably uses polyvinyl chloride (PVC) under an environment requiring flame retardancy, and preferably uses a polyethylene resin having excellent water-barrier performance in the case of the marine cable 100 for offshore wind power according to the present disclosure.

When the marine cable 100 for offshore wind power shown in FIGS. 1 and 2 is laid under the seabed, the marine cable 100 is always exposed to water pressure, and, when the marine cable 100 is damaged, the core jacket 390, the armor bedding layer 600 or the filling members 400 may block moisture penetration. However, it is difficult to permanently prevent moisture penetration into the core 300, and thus, a method of minimizing diffusion of moisture in the event of unavoidable occurrence of moisture penetration is required together with the water-barrier function of the core 300 itself.

The above-described wire shield layer 360 serves as a passage through which fault current flows, protects the marine cable 100 from external impact, and has a structure in which the shield wires 361 spaced apart from each other by predetermined intervals are wound in a spiral so as to prevent the electric field from being discharged to the outside, and the performance of the wire shield layer 360 may be determined by the diameter and number of the shield wires 361 and the interval between the shield wires 361.

However, in consideration of the structures of the marine cable 100 for offshore wind power and the core 300 shown in FIGS. 1 and 2, there is the possibility that moisture having penetrated into the core 300 could be diffused in the length direction of the marine cable 100 for offshore wind power through spaces between the shield wires 361 of the wire shield layer 360 and the water-barrier tape layers 350 and 370.

Therefore, the inventors of the present disclosure confirmed through tests that, when the size of a water tree in the insulating layer 330 measured based on standard ASTM D6097 satisfies a specific range, preferably when the size of the water tree satisfies the specific range on the assumption that the degree of crosslinking and the degree of crystallinity of the insulating layer 330 are adjusted to respective specific ranges, the dielectric strength of the marine cable 100 for offshore wind power is greatly improved, and thereby completed the present disclosure.

Concretely, when the size of the water tree in the insulating layer 330 measured based on standard ASTM D6097 is adjusted to 850 μm or less, the dielectric strength of the marine cable 100 for offshore wind power may be greatly improved. Preferably, when the size of the water tree in the insulating layer 330 is adjusted to 850 μm or less by adjusting the degree of crosslinking of the insulating layer 330 to 77% or more and adjusting the degree of crystallinity of the insulating layer 330 to 35% or more, the marine cable 100 for offshore wind power may implement dielectric strength of 80 kV/m or more.

Here, the size of the water tree is the size of a water tree having the maximum size among water trees present in the insulating layer 330, and the size of the water tree indicates the length of the longest width of the water tree.

Here, the degree of crosslinking of the insulating layer 330 may be adjusted by adjusting the content of the crosslinking agent added to the insulating layer 330 and the process conditions of crosslinking reaction, and the degree of crystallinity of the insulating layer 330 may be adjusted by the content of the crosslinking by-products or other foreign substances in the insulating layer 330 and extruding/cooling process conditions.

The degree of crosslinking of the insulating layer 330 is calculated by a method set based on standard ASTM D2765 and, in the case in which the insulating layer 330 is formed of crosslinked polyethylene (XLPE), the insulating layer 330 does not include a filler, and thus, the degree of crosslinking of the insulating layer 330 may be calculated from Equation 1 below.

That is, thin pieces having a width of about 2 mm, a length of about 2 mm, and a thickness of about 1 mm are cut off from the insulating layer 330, an insulating layer specimen is prepared by weighing the thin pieces about 0.3 g, and then, "the total weight of the insulating layer specimen" is accurately measured. Thereafter, the insulating layer specimen is inserted into a mesh net, the mesh net is put into boiling xylene, is refluxed using a reflux cooler for 12 hours, and is then sufficiently dried at a temperature of 80° C., the remaining insulating layer specimen is extracted, "the weight of the insulating layer specimen after reflux in xylene and drying" is measured, and the degree of crosslinking of the insulating layer 330 may be calculated from Equation 1 below using "the total weight of the insulating layer specimen" and "the weight of the insulating layer specimen after reflux in xylene and drying".

Degree of Crosslinking (%)=(Weight of Insulating Layer Specimen after Reflux in Xylene and Drying/Total Weight of Insulating Layer Specimen)×100 [Equation 1]

Further, the degree of crystallinity of the insulating layer 330 may be calculated from Equation 2 below using heat of fusion ΔH of the insulating layer 330, measured at a heating rate of 10° C./min from −20° C. to 150° C. in a nitrogen gas atmosphere through a differential scanning calorimeter (DSC), and calculated from a baseline from 20° C. to 120° C. In Equation 2 below, $\Delta H_{PE}$ is heat of fusion of polyethylene, i.e., 293.6 J/g.

$$\text{Degree of Crystallinity (\%)} = \frac{\Delta H}{\Delta H_{PE}} \times 100 \quad \text{[Equation 2]}$$

Further, a method of measuring the size of the water tree based on standard ASTM D6097 will be described. A dye solution is prepared by raising the temperature of a 0.1% crystal violet solution while stirring the crystal violet solution on a hot plate set to a temperature of 70° C. for 1 hour, or by putting 6 g of methylene blue and 0.5 g of $Na_2CO_3$ into 200 ml of distilled water and raising the temperature of an acquired solution while stirring the solution on a hot plate set to a temperature of 70° C. for 4 hours, after one day, an insulating layer specimen is put into the dye solution while maintaining the dye solution at the temperature of 70° C., so that the insulating layer specimen is dyed at the temperature of 70° C. for 80 minutes, and the insulating layer specimen is taken out of the dye solution, the insulating layer specimen is taken out of the dye solution, is washed with distilled water, is wiped using ethanol, and is then examined through a microscope so that the sizes of water trees in the insulating layer specimen are observed.

EXAMPLES

1. Manufacturing Example

Insulating layer specimens (having a thickness of 150 μm) and cable specimens having degrees of crosslinking, degrees of crystallinity and the maximum water tree sizes set forth in Table 1 below, were prepared.

TABLE 1

| | Example 1 | Example 2 | Comp. Example 1 | Comp. Example 2 |
|---|---|---|---|---|
| Degree of crosslinking (%) | 80.1 | 77.4 | 71.5 | 69.4 |
| Degree of crystallinity (%) | 36.0 | 35.1 | 34.5 | 33.1 |
| Maximum water tree size (μm) | 830 | 850 | 920 | 1070 |

2. Property Evaluation

1). Breakdown Voltage (BDV) Evaluation 20 insulating layer specimens according to each of Examples and Comparative Examples were cut into a size of 5 cm×5 cm, the breakdown voltages of the respective insulating layer specimens were measured by a ramp-up method using a sphere-sphere electrode of 0.5 inches while raising the temperature at 0.5 kV/s, dielectric breakdown field strengths (kV/mm) were calculated by converting the size to the thickness, and 63.2% dielectric breakdown field strengths were calculated using the Weibull distribution.

2). Long-Term Water Tree Evaluation Test

The cable specimens were soaked in a 3.5% NaCl solution based on test Regime B of standard CIGRE TB722, aging was performed by applying a frequency and voltage set by standard CIGRE TB722 for a designated time, and thereafter, the cable specimens underwent an AC dielectric breakdown test within 72 hours, so that whether or not the respective cable specimens pass the test or fail to pass the test was confirmed.

Results of property evaluation are set forth in Table 2 below.

TABLE 2

| | Example 1 | Example 2 | Comp. Example 1 | Comp. Example 2 |
|---|---|---|---|---|
| Breakdown voltage (63.2%) | 90 | 84 | 75 | 60 |
| Long-term water tree evaluation | Pass | Pass | Fail | Fail |

As set forth in Table 2, it is confirmed that the insulating layer specimens according to Examples 1 and 2 having the maximum water tree sizes of 850 μm or less by adjusting the degree of crosslinking to 77% or more and the degree of crystallinity to 35% or more exhibited high breakdown voltages and excellent results of test Regime B, but the insulating layer specimens according to Comparative Examples 1 and 2, the degrees of crosslinking, the degrees of crystallinity and the maximum water tree sizes of which are below respective standards, exhibited greatly reduced results of test Regime B.

As is apparent from the above description, a marine cable for offshore wind power according to the present disclosure adjusts the sizes of water trees to a specific size or less by precisely controlling a degree of crosslinking and a degree of crystallinity of insulating layers of cores, thereby being capable of improving dielectric strength and consequently securing a long lifespan.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A marine cable for offshore wind power, comprising:
- at least one core comprising a conductor;
- an inner semiconductive layer configured to surround the conductor;
- an insulating layer configured to surround the inner semiconductive layer;
- an outer semiconductive layer configured to surround the insulating layer;
- a wire shield layer configured to surround the outer semiconductive layer; and
- a core jacket configured to surround the wire shield layer,
- wherein the insulating layer comprises crosslinked polyethylene (XLPE) and has a breakdown voltage (BDV) equal to or greater than 80 kilovolts per millimeter (kV/mm),
- wherein sizes of water trees in the insulating layer, measured based on standard American Society for Testing and Materials (ASTM) D6097, are equal to or less than 850 micrometers (μm),
- wherein a degree of crosslinking of the insulating layer is equal to or greater than 77%, and
- wherein a degree of crystallinity of the insulating layer is from 35% to 36%, and
- wherein an Alternating Current (AC) dielectric breakdown of the marine cable, which is aged based on test Regime B of standard CIGRE TB722 by soaking the marine cable in a 3.5% Sodium Chloride (NaCl) solution and applying a frequency of 500 Hertz (Hz) and voltage of 5.5 kV/mm for a time period of at least 3,000 hours, does not occur within 72 hours of the time period after aging.

2. The marine cable according to claim 1, wherein the at least one core further comprises:
- an inner water-barrier tape layer provided between the outer semiconductive layer and the wire shield layer and configured to surround the outer semiconductive layer;
- an outer water-barrier tape layer configured to surround the wire shield layer; and
- a metallic sheath layer configured to surround the outer water-barrier tape layer.

3. The marine cable according to claim 2, wherein the outer water-barrier tape layer comprises at least one selected from the group consisting of powder, a tape, a coating layer, and a film, comprising a superabsorbent polymer (SAP).

4. The marine cable according to claim 1, comprising a plurality of cores,
- wherein filling members are provided at a center among the plurality of cores and in regions outside the plurality of cores.

5. The marine cable according to claim 4, wherein the filling members comprise yarns formed of polypropylene.

6. The marine cable according to claim 4, wherein:
- a binding tape layer configured to finish the plurality of cores and the filling members so as to form a circular cross-section is provided; and an armor bedding layer comprising a mixture of polypropylene yarns and bitumen is provided outside the binding tape layer.

7. The marine cable according to claim 6, wherein:

a metal armor layer is provided outside the armor bedding layer; and an anticorrosion layer comprising a mixture of polypropylene yarns and bitumen is provided outside the metal armor layer.

8. The marine cable according to claim 1, wherein a thickness of the insulating layer is 150 μm.

9. A marine cable for offshore wind power, comprising:

a core, comprising a conductor;

an inner semiconductive layer, which surrounds the conductor;

an insulating layer, which surrounds the inner semiconductive layer and comprises crosslinked polyethylene (XLPE), has a breakdown voltage (BVD) greater than or equal to 80 kilovolts per millimeter (kV/mm), has a degree of crosslinking greater than or equal to 77%, and has a degree of crystallinity between 35% and 36%;

an outer semiconductive layer that surrounds the insulating layer;

a wire shield that surrounds the outer semiconductive layer; and a core jacket that surrounds the wire shield, wherein sizes of water trees in the insulating layer, measured based on standard ASTM D6097, are less than or equal to 850 micrometers (μm).

* * * * *